United States Patent
Gkiotsalitis et al.

(10) Patent No.: US 10,643,478 B2
(45) Date of Patent: May 5, 2020

(54) METHOD FOR ROUTE OPTIMIZATION FOR DEMAND RESPONSIVE TRANSPORTATION

(71) Applicant: NEC Laboratories Europe GmbH, Heidelberg (DE)

(72) Inventors: Konstantinos Gkiotsalitis, Frankfurt (DE); Zongxiang Wu, Mannheim (DE); Oded Cats, Rotterdam (NL)

(73) Assignee: NEC CORPORATION, Tokyo (JP)

( * ) Notice: Subject to any disclaimer, the term of this patent is extended or adjusted under 35 U.S.C. 154(b) by 289 days.

(21) Appl. No.: 15/920,645

(22) Filed: Mar. 14, 2018

(65) Prior Publication Data

US 2018/0268705 A1   Sep. 20, 2018

Related U.S. Application Data

(60) Provisional application No. 62/471,474, filed on Mar. 15, 2017.

(51) Int. Cl.
*G08G 1/00* (2006.01)
*G06F 16/903* (2019.01)

(52) U.S. Cl.
CPC ....... *G08G 1/202* (2013.01); *G06F 16/90335* (2019.01)

(58) Field of Classification Search
CPC . B25J 13/003; B25J 5/005; B25J 9/162; B25J 9/1694; B25J 13/081; B25J 13/089; H04R 3/04; H04R 1/406; H04R 7/30; H04R 3/005; H04R 1/028; H04R 29/00; G10L 21/02; G10L 2021/02166; G05D 1/0231; G05D 1/027; G05D 1/0291; G05D 1/0088; G05D 1/0255; G01S 15/89; G01S 7/52004; G01S 3/80; G01S 5/0215; Y10S 901/46; Y10S 901/01; H04S 2400/15

See application file for complete search history.

(56) References Cited

U.S. PATENT DOCUMENTS

2013/0339266 A1\* 12/2013 Looman ............... G05D 1/0291
                                                              705/338

OTHER PUBLICATIONS

Gkiotsalitis K., and Cats O.,: "Exact Optimization of Bus Frequency Settings Considering Demand and Trip Time Variations". In: 96th Transportation Research Board Annual Meeting, Paper No. 17-01871, Jan. (2017).

(Continued)

*Primary Examiner* — Basil T. Jos
(74) *Attorney, Agent, or Firm* — Leydig, Voit & Mayer, Ltd.

(57) ABSTRACT

A method for automatically allocating a plurality of available vehicles to a plurality of original service lines and virtual service lines of a transportation network includes receiving the virtual lines from a virtual line generator; approximating a constrained fleet allocation problem with an unconstrained fleet allocation problem that utilizes penalty terms to penalize violation of constraints; performing a multi-start sequential genetic search using a first population to identify a first solution; generating, using the first solution, a second population; performing a second multi-start genetic search using the second population to identify a second solution; and dispatching vehicles to different routes and lines according to the second solution.

15 Claims, 6 Drawing Sheets

(56) References Cited

OTHER PUBLICATIONS

Ibarra-Rojas, O., F. Delgado, R. Giesen, and J. Muñoz, Planning, operation, and control of bus transport systems: A literature review. Transportation Research Part B: Methodological, vol. 77, 2015, pp. 38-75.

Verbas, I. Ö., C. Frei, H. S. Mahmassani, and R. Chan, Stretching resources: sensitivity of optimal bus frequency allocation to stop-level demand elasticities. Public Transport, vol. 7, No. 1, 2015, pp. 1-20.

Verbas, I. And H. Mahmassani, Optimal Allocation of Service Frequencies over Transit Network Routes and Time Periods: Formulation, Solution, and Implementation Using Bus Route Patterns. Transportation Research Record: Journal of the Transportation Research Board, 9 No. 2334, 2013, pp. 50-59.

\* cited by examiner

METHOD FOR ROUTE OPTIMIZATION FOR DEMAND RESPONSIVE TRANSPORTATION

CROSS-REFERENCE TO PRIOR APPLICATION

Priority is claimed to U.S. Provisional Patent Application No. 62/471,474, filed on Mar. 15, 2017, the entire disclosure of which is hereby incorporated by reference herein.

FIELD

The present invention relates to transportation services, and more specifically, to improving the efficiency of transportation services that serve a number of stops.

BACKGROUND

One of the most common characteristics of transportation services is the serving of a series of pre-defined points, for example, train stops, bus stops, and goods delivery and pick-up points. Such a series of pre-defined points constitutes a service line with a specific origin and destination. Many transportation services have this characteristic, i.e. each vehicle serves a pre-determined set of sequential points, e.g. in both directions. For instance, a tram line serves a number of pre-defined tram stops between an origin terminal and a destination terminal and back.

Several studies have developed methods for allocating an optimal amount of resources (e.g., an optimal number of vehicles) to each service line of a broader transportation network (e.g., a network of bus lines in a city, a network of tram lines in a city, a network of logistic lines within a pick-up and delivery area) in a demand-responsive manner. Such studies include Gkiotsalitis et al. (K. Gkiotsalitis and O. Cats; *Exact Optimization of Bus Frequency Settings Considering Demand and Trip Time Variations;* 96th Transportation Research Board Annual Meeting, Paper No. 17-01871; January 2017) and Ibarra-Rojas et al. (O. Ibarra-Rojas, F. Delgado, R. Giesen, and J. Muñoz; *Planning, operation, and control of bus transport systems: A literature review*; Transportation Research Part B: Methodological, Vol. 77, 2015, pp. 38-75). The common objective of the vehicle/fleet allocation to lines is to simultaneously meet demand and limit operational costs given the constraint of resource limitations, e.g. a size of an available vehicle fleet. In those studies, the total number of available vehicles is distributed to different lines via a centralized optimization approach in order to satisfy demand at the line-level while limiting operational costs.

Additional previous work has focused on dividing the vehicle/fleet allocation problem into two stages, wherein all vehicles are pre-allocated at the line level during a first stage and minor adjustments are performed during a second stage by modifying routes for a small portion of the pre-allocated vehicles. Previous work has also utilized offline historical demand data between point couples to create additional fixed lines that cover only the specifically observed demand patterns. Such previous work includes, e.g., Verbas et al. (I. Verbas, C. Frei, H. Mahmassani, and R. Chan; *Stretching resources: sensitivity of optimal bus frequency allocation to stop-level demand elasticities*; Public Transport, Vol. 7, No. 1, 2015, pp. 1-20) and Verbas et al. (I. Verbas and H. Mahmassani, *Optimal Allocation of Service Frequencies over Transit Network Routes and Time Periods: Formulation, Solution, and Implementation Using Bus Route Patterns*; Transportation Research Record: Journal of the Transportation Research Board, 9 No. 2334, 2013, pp. 50-59).

SUMMARY

According to an embodiment, a method is described for automatically allocating a plurality of available vehicles to a plurality of original service lines and virtual service lines of a transportation network. The method includes receiving the virtual lines from a virtual line generator; approximating a constrained fleet allocation problem with an unconstrained fleet allocation problem that utilizes penalty terms to penalize violation of constraints; performing a multi-start sequential genetic search using a first population to identify a first solution; generating, using the first solution, a second population; performing a second multi-start genetic search using the second population to identify a second solution; and dispatching vehicles to different routes and lines according to the second solution.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In performing vehicle/fleet allocation, satisfying demand at the line-level may not provide an optimal utilization of vehicles. For instance, because different sections of a service line may exhibit significant demand variation over time, a set of points within the line may experience high demand while another set of points within the line experiences low demand. Therefore, allocating the same number of vehicles to all section of the line can result in significant vehicle under-utilization within sections of the line that experience lower demand relative to higher demand sections. Furthermore, because different service directions of a service line exhibit significant demand variation over time, allocating the same number of vehicles to all service directions of the line can result in significant vehicle under-utilization in the service directions that experience lower demand relative to higher demand directions.

Therefore, optimizing the fleet allocation at the line-level is not sufficient to maximize fleet utilization. Instead, maximizing fleet utilization requires providing a more flexible scheme where vehicles are allowed to serve sub-parts of service lines while such sub-parts maintain the characteristics of the original lines e.g., the points to be traversed and the sequence in which they are traversed. However, due to the sheer volume of points to be traversed, there are a vast number of service line sections, i.e. service sub-lines, that can be generated by combining such points to be traversed into service sub-lines. Consideration of all potential service sub-lines that can be generated injects substantial complexity into the technical problem of fleet allocation. For instance, the technical problem of fleet allocation on a network with five fixed lines where at each line the range of allocated vehicles can be from 0 to 30 requires $30^5$ computation iterations. If all potential sub-line combinations are considered and we end up with 50 new lines, this requires $30^{50} \sim +\infty$ computation iterations for evaluating each possible fleet allocation scenario. This exponential growth of the computational complexity of the fleet allocation problem when potential sub-lines are considered hinders the operation of a demand-responsive route optimization where (a) new sub-lines are introduced on-the-fly and (b) the original lines are re-adjusted for matching the demand changes over time across the service network. In addition, fixed lines allow only the allocation of vehicles within those lines and the vehicle operator does not have the option to choose between different line formations that can match the demand in an improved manner or improve practicality of the operations.

Given the practical and computational complexity resulting from the vast number of potential service sub-lines, previous work has not considered allocating vehicles to potential sub-lines. Instead, prior work has focused primarily on generating fixed lines based on demand patterns in an offline manner because of the substantial computational complexity required for evaluating all potential sub-lines that can be generated in a study area and allocating vehicles to those sub-lines. Embodiments of the present invention improve the allocation of transportation resources, e.g. vehicles, within transportation networks by providing novel systems and methods for considering potential service sub-lines during said allocation of transportation resources. Embodiments of the present invention thereby provide for improvements in transportation network operation by increasing operational efficiency through the reduction of operational costs required to satisfy demand at service points throughout the network.

Service lines in a transportation network often start from an origin point, serve a pre-defined number of points (stops), reach a final destination point, and then return to the origin. Improving the efficiency of such service lines is a multi-objective optimization problem with two conflicting priorities: (i) satisfying demand at each point (stop), and (ii) reducing operational costs. Embodiments of the present invention provide novel systems and methods that employ a multi-start sequential genetic search in solving the computationally intractable problem of vehicle allocation to service lines and sub-lines given a set of practical and operational constraints. Specifically, systems and methods according to embodiments of the invention (a) perform a genetic search in which all elements of a genotype are checked one-by-one in a sequential manner, (b) aggressively replace the worst parent of a couple with newly generated offspring at each iteration in order to rapidly identify an optimal solution, and (c) utilize multiple parents (more than two) in order to explore a solution space from multiple starting points and avoid local optimum traps.

Embodiments of the present invention provide systems and methods that utilize one or more genetic searches that employ crossovers between genotypes of members of a population at different levels of granularity, e.g. sequential crossovers at the smallest unit of the genotype and tailored crossovers at a larger unit of the genotype (the larger units including multiple one of the smallest unit). Specifically, systems and methods are described herein that evaluate a penalty function of an allocation profile at a scale of the larger unit and allow the presence of some elements that, at the scale of the smallest unit, deteriorate the penalty function score if the combination of all the elements returns a penalty function improvement at the scale of the large unit.

Embodiments of the present invention provide systems and methods that generate and utilize virtual lines that represent segments of physical service lines, i.e. service sub-lines, for one-stage optimization of a demand-responsive automated fleet allocation problem.

A Method is described herein for automatically allocating a fleet of vehicles to one or more service lines and sub-lines of a transportation network. The method includes generating virtual lines utilizing an input database, approximating a problem of allocating vehicles to the service lines and sub-lines while subject to certain constraints with an unconstrained vehicle allocation problem that utilizes penalty terms to penalize the violation of constraints, rapidly exploring the vast solution space with a multi-start sequential genetic search in order to find an approximate global optimal solution, utilizing the approximate global optimal solution to form a new population for a second genetic search, performing the second genetic search during which tailored crossovers are performed, and dispatching vehicles into different routes and lines based on the results of the second genetic search. The aforementioned method can be reapplied in a demand-responsive manner (e.g., when spatio-temporal demand changes significantly).

Systems and methods for automatically generating new "virtual lines," which are part of a set of "original lines," and adjusting the number of vehicles allocated to the new virtual lines in order to satisfy a time-varying demand is described herein. The term "vehicle" as used herein can refer to various mobile entities capable of serving a series of demand points, e.g. cars, trucks, drones, robots, etc. The term "original lines" can be used to refer to pre-defined physical service lines that exist in a transportation service network or computerized representations thereof. The term "virtual lines" can be used to refer to segments, or sub-parts, or the pre-defined physical service lines, i.e. service sub-lines that serve only certain segments of the original lines.

Figure 1:
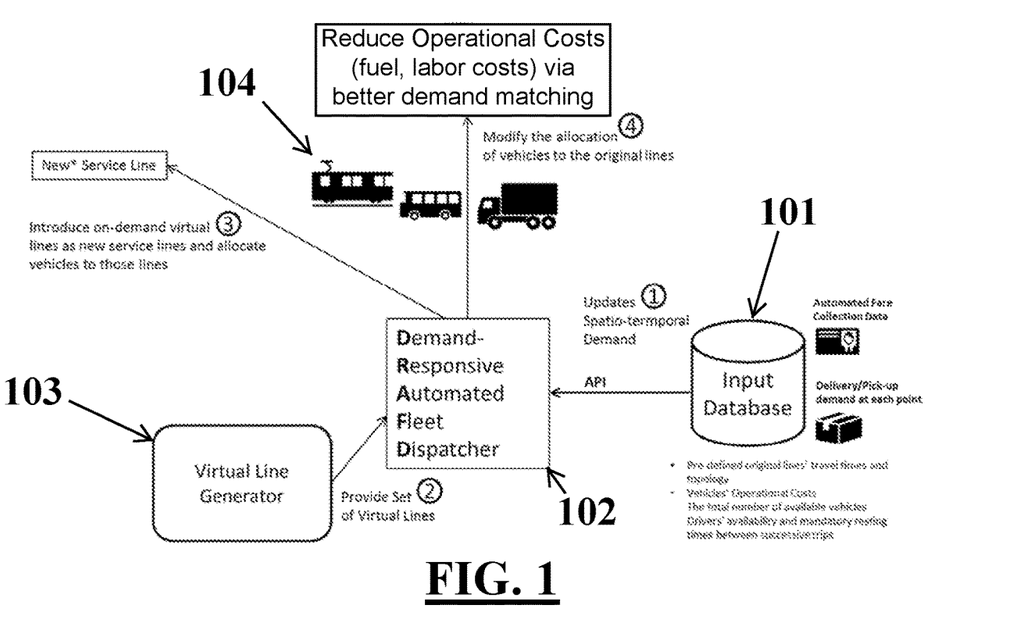
FIG. 1 is a diagram of a demand-responsive automated fleet dispatching system for executing a process for allocating resources within a transportation network according to an embodiment of the invention.

FIG. 1 is a diagram of a demand-responsive automated fleet dispatching system for executing a process for allocating resources within a transportation network according to an embodiment of the invention. An input database 101 is provided which stores information pertaining to travel times along pre-defined original lines, origin/destination points of each original line, the nature of those lines, (e.g., whether they are circular, bi-directional, etc.), delivery and pick-up demand at each point along each original line of the network and variation of such demand over time. In public transportation systems, the delivery and pick-up demand at each point can be derived from automated fare collection data, while in logistics systems, the delivery and pick-up demand at each point can be derived from delivery and pick-up data. Furthermore, the input database 101 additionally stores information pertaining to the costs of operating vehicles, the total number of available vehicles, and drivers' availability, e.g. based on mandatory resting times between successive trips.

The demand-responsive automated fleet dispatching system further includes a Demand-Responsive Automated Fleet Dispatcher (DRAFD) 102 configured to allocate vehicles to different lines (both original and virtual ones) and a Virtual Line Generator (VLG) 103 configured to divide representations of the complete physical service lines, i.e. the original lines, into potential service sub-lines, or virtual lines. Each of the DRAFD 102 and the VLG 103 can be, for example, a physical machine including compute resources, storage resources, and network resources or a component thereof. Furthermore, each of the DRAFD 102 and the VLG 103 can be a virtual machine or a collection of virtual machines hosted by one or more physical machines including compute resources, storage resources, and network resources. The compute resources of the physical machines can, for example, include one or more processors each having one or more processor cores. The storage resources of the physical machines can, for example, include processor readable memory, e.g., random-access-memory (RAM) and/or cache memory. The network resources can include, for example, a physical network interface controller. The physical machines can store, at the storage resources thereof, a set of processor executable instructions necessary to perform the processes executed by the DRAFD 102 and the VLG 103 and configured to be executed by the processing resources thereof.

The DRAFD 102 allocates available vehicles to a mix of original lines and virtual lines of the transportation network. In order to do so, the DRAFD 102 receives information stored at the database 101 and a set of virtual lines provided by the VLG 103. Alternatively, the DRAFD 102 can generates sets of virtual lines itself, for example, by including its own virtual line generator. The allocation of available vehicles to the original lines and virtual lines can be updated every time a significant demand variation is observed. For example, in public transport systems and logistics operations, a one-day period can be split into three to six time periods within which observed demand is relatively homogeneous and the allocation of available vehicles can be updated as one such time period transitions to another. The time periods during which observed demand is relatively homogenous could be, for example, an early morning time period, a morning peak time period, a noon time period, an early afternoon time period, an afternoon peak time period, and a night time period.

The demand-responsive automated fleet dispatching system 100 additionally includes a set of vehicles 104 that can be allocated to one or more original lines and/or virtual lines of the transportation system. In performing demand-responsive automated fleet dispatching, the input database 101 provides updated spatio-temporal demand data to the DRAFD 102 at (1). At (2), the VLG 103 provides a set of virtual lines to the DRAFD 102. At (3), the DRAFD introduces on-demand virtual lines as new service lines and allocates vehicles to those lines. At (4), the DRAFD modifies the allocation of vehicles to the original lines in order to reduce operations costs through superior demand matching.

In allocating the available vehicles, the DRAFD 102 is configured to solve a fleet allocation problem. The DRAFD 102 can exhaustively generate virtual lines (or receive virtual lines from the VLG 103—which can exhaustively generate virtual lines) and does not perceive the demand-responsive fleet allocation problem as a problem of allocating resources to a static, pre-defined set of lines, for example a set of lines that is already pre-defined based on offline demand data patterns. According to embodiments of the invention, the DRAFD 102 and/or the VLG 103 generate all possible virtual lines and the DRAFD 102 performs a one-stage vehicle allocation for a set of generated routes. For a time period during which observed demand can be characterized as homogeneous, embodiments of the present invention define the single-stage allocation problem as follows:

$$\operatorname*{argmin}_{n} f(n) := \left( \sum_{l_o \in L_o} \sum_{i \in S} \sum_{j \in S} (b_{l_o,i,j}/2) \left( \sum_{p \in K_{l_o,i,j}} \frac{n_p}{C_p} \right)^{-1} \right) + \alpha_1 \left( \sum_{l \in L} n_l C_l \right) + \alpha_2 \left( \sum_{l \in L} n_l \right)$$

subject to:
$$c_1(n) := \left( \sum_{l=1}^{L} n_l \right) - \gamma \leq 0$$

$$c_2(n) = \left( \sum_{l \in L-L_o} n_l \right) - \pi\gamma \leq 0$$

$$n_l \in N^L, \forall l \in L$$

$$n \geq \sum_{l \in L-L_o} \begin{cases} 1 & \text{if } n_l > 0 \\ 0 & \text{if } n_l = 0 \end{cases}$$

where the objective function of the optimization problem has three terms. The second term, $\alpha_1 \Sigma_{l \in L} n_l C_l$, denotes the operational cost in vehicle-kilometers traveled where $n_l$ is the number of allocated vehicles to each line l, $C_l$ is the expected round-trip travel time for each line l and $\alpha_l$ is a weighting factor. The third term $\alpha_2 \Sigma_{l \in L} n_l$ is the fixed cost of utilizing one more vehicle. The first term, which is contradictory to the $2^{nd}$ and $3^{rd}$ terms, represents the demand matching level at all points of the network. The demand matching can be defined in different ways, for example, as the level of demand between different points of a line multiplied by the waiting time of demand generators such as passengers and/or goods. To explain the first term, let assume that $L_o$ is the set of original lines and L the set of all lines—both virtual and original. $b_{l_o,i,j}$ is the demand between points i,j that can be served from the original service lo or any other virtual line service which is generated from the original service lo. In addition, $K_{l_o,i,j}$ is a function that returns the set of virtual lines that can serve the demand $b_{l_o,i,j}$. Therefore, the waiting time of passengers/goods that want to move between two points i,j of the original line $l_o$ is equal to the inverse of the number of vehicles allocated to all lines in $K_{l_o,i,j}$ divided by the total travel time of each of those lines.

The objective function of the optimization problem is also subject to several additional constraints. The first constraint $(n_1, n_2, \ldots, n_L) \in N^L$ requires that the number of allocated vehicles to each line $n_l$ is an integer value. The second constraint $\Sigma_{l=1}^{L} n_l \leq \gamma$ requires that the total number of allocated vehicles not exceed the maximum number of available vehicles, denoted by $\gamma$. The third constraint $\Sigma_{l \in L-L_o} n_l \leq \pi\gamma$ requires that the total number of vehicles allocated to virtual lines not exceed the maximum number of vehicles, $\pi\gamma$, that can serve virtual lines for practicality reasons. The fourth constraint provides that the number of virtual lines that can be allowed to be operational is denoted with η.

The objective function is non-continuous, fractional (non-linear), non-convex, and contains the secondary function $K_{l_o,i,j}$ which is critical for returning all virtual lines that can serve the demand between two points. This restricts the implementation of exact optimization methods and the computational complexity with simple enumeration is exponential: $Z^P$, where Z is an integer set from which the number of vehicles of each line is selected and $\rho=\Sigma_{l \in L} n_l$. Let us say that at each line can be allocated any number of vehicles from 0 to 100; then, for a set of 500 virtual lines the number of computations are $100^{500} \sim +\infty$. Therefore, finding a globally optimal solution for the allocation of vehicles to lines via a one-stage optimization is not possible with the use of state-of-the-art approaches for discrete, non-convex optimization such as simple enumeration (brute-force).

Figure 2:
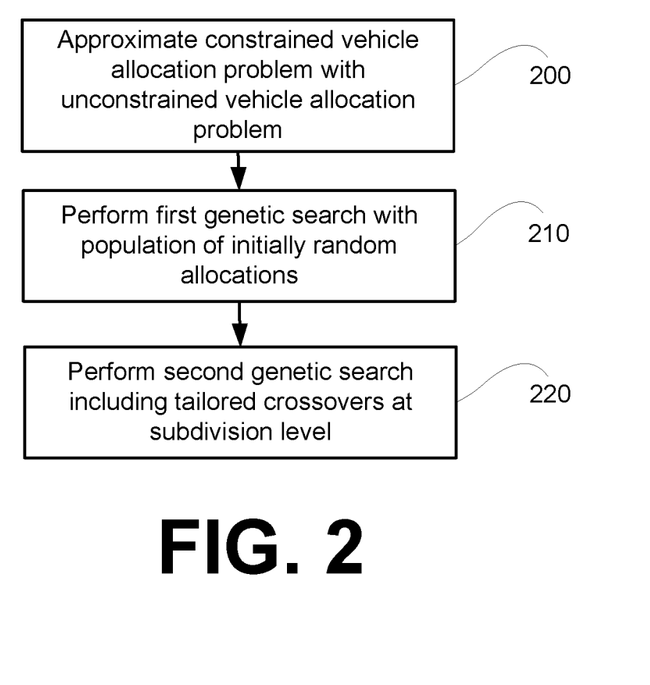
FIG. 2 is a flow diagram of a method for performing demand-responsive fleet dispatching according to an embodiment of the invention.

FIG. 2 is a flow diagram of a method for performing demand-responsive fleet dispatching according to an embodiment of the invention. At 200, the constrained vehicle allocation optimization problem is approximated by an unconstrained vehicle allocation optimization problem in which all constraints are included in the objective function with the use of positive penalty terms $W_1$, $W_2$ as presented below.

$$\operatorname*{argmin}_n P(n) := f(n) + W_1(\min[-c_1(n), 0])^2 + W_2(\min[-c_2(n), 0])^2$$

subject to: $\quad n_l \in N^L, \forall l \in L$ $$n \geq \sum_{l \in L-L_o} \begin{cases} 1 & \text{if } n_l > 0 \\ 0 & \text{if } n_l = 0 \end{cases}$$

Those penalty terms are greater than zero when the problem constraints are violated (thus, adding more cost to the original objective function) and equal to zero when all constraints are satisfied (thus, not affecting negatively the objective function score). The weights of the penalty terms, $W_1$, $W_2$, have high values such that priority is given to the satisfaction of constraints over the objective function minimization. Their values can be determined randomly with the only requirement being that they are high enough for ensuring that the violation of a constraint penalizes the objective function more than any potential increase of the objective function in order to prioritize first the satisfaction of all constraints and then shift the attention to the reduction of $f(n)$, i.e. the objective function. This resulting penalty function, $P(n)$, returns a different score when the decision variables n change their values, and the objective of the proposed sub-division and sequential genetic search is to find a set of vehicle allocations n* that minimizes the penalty function (approximate global optimum). Given the exponential complexity of the problem and the large set of potential solutions—($\sim \pm \infty$) for real world scenarios—the problem is computationally intractable. The sub-division and sequential genetic search are employed to perform an effective search of the solution space.

At 210, a sequential genetic search is initiated using a population of initially random parents. Each parent, $K_1$, $K_2$, ..., $K_m$, specifies an allocation of vehicles to lines. For example, for parent $K_1$ the allocation of vehicles to lines is $n^{\{K1\}}=\{n_1^{K1}, \ldots, n_{|L|}^{K1}\}$ where $n_1^{K1}, \ldots, n_{|L|}^{K1}$ are random integer numbers from the admissible set Z. This initial random allocation of vehicles for each parent $K_1$ is the genotype of the parent. For example, the initial random allocation $n^{\{K1\}}=\{n_1^{K1}, \ldots, n_{|L|}^{K1}\}$ is the genotype of the parent $K_1$. During the sequential part of the genetic search, two random parents from the set $K_1, K_2, \ldots, K_m$ are selected as a couple and a sequential genetic search is applied to the genotypes of those two parents. For example, if the parents $K_1$, $K_3$ are randomly selected for the sequential genetic search, then the sequential genetic search is performed according to the following pseudocode:

```
Initialize Best_Offspring equal to the parent K_1 if P(n^{K1}) ≤ P(n^{K3}) or K_3 if P(n^{K3}) < P(n^{K1})
Initialize Offspring = Best_Offspring
for each line l following the sequence 1,2,...,|L|
    Sequential Crossover: Replace the l^th element of the Offspring's genotype with the l^th element of the
    genotype parent K_1 (in this case, n_l^{K1}) or the l^th element of parent K_3 according to a 50% probability
    if P(n^{Offspring}) < P(n^{BestOffspring}): Update the Best_Offspring: Best_Offspring = Offspring
        Update Offspring: Offspring = Best_offspring
    endif
    Sequential Mutation: Replace the l^th element of the Offspring's genotype with a random integer
    number from the admissible set Z (this can be repeated several times)
    if P(n^{Offspring}) < P(n^{BestOffspring}): Update the Best_Offspring: Best_Offspring = Offspring
        Update Offspring: Offspring = Best_offspring
    endif
endfor
Replace the allocation n^{K1}, n^{K3} of the worst performing parent K_1, K_3 with the allocation n^{BestOffspring} of
the Best_offspring
```

During the sequential genetic search, the worst performing parent of the couple, for example the couple $K_1$, $K_3$, is replaced by the best offspring that results from the sequential crossover and sequential mutation. Thereafter, another couple is randomly selected and the same procedure continues until a termination criterion is met (i.e., a predetermined maximum number of iterations).

Using the sequential genetic search described above provides a number of advantages. Performing the sequential crossover and mutation increases the probability of producing better offspring and also increases the speed of the search process because the elements of each allocation are considered one by one. However, the sequential crossover and mutation also increases the chances of becoming trapped by a local optimum. Aggressive Replacement of Parents with Offspring rapidly generates new populations with improved allocations thereby moving in an aggressive direction towards the optimal solution. Utilization of multiple parents allows for exploration of the solution space from multiple starting points and thereby increases the probability of identifying a solution closer to the global optimum and of becoming trapped by a local optimum.

Further improvements to the allocation of vehicle provided by the Offspring* solution can be realized by dividing the entire set of individual original and virtual lines to which vehicles are allocated into larger groups of lines, i.e. sub-divisions, and then performing a sub-division genetic search at the sub-division level at 220. During the sub-division genetic search at 220, crossovers at the sub-division level can be performed in order to increase the probability of producing better offspring. For providing an initial set of allocations for the second genetic search, the Offspring* solution with allocation $n^{\{Offspring^*\}} = \{n_1^{Offspring^*}, \ldots, n_{|L|}^{Offspring^*}\}$ can be used to generate new parents $O_1$, $O_2$, ..., $O_m$. Then, tailored crossovers between sub-divisions of the new parents can be performed during the second genetic search—and can be performed in a manner that ensures that the constraints of the initial constrained optimization problem continue to be satisfied. For example, if the parents $O_1$, $O_3$ are randomly selected for the sub-division genetic search, then the sub-division genetic search is performed according to the following pseudocode:

```
Initialize Best_Offspring equal to the new parent O_1 if P(n^{O1}) ≤ P(n^{O3}) or to the new parent O_3 if
P(n^{O3}) < P(n^{O1})
Initialize Offspring = Best_Offspring
for each sub-division j ∈ {A, B, C, ... }
    Sub-Division Crossover: Replace the j^th sub-division of the Offspring with the j^th sub-division of parent
    O_1 or the j^th sub-division of parent O_3 according to a 50% probability
    if P(n^{Offspring}) < P(n^{BestOffspring}) and all constraints remain satisfied:
        Update the Best_Offspring: Best_Offspring = Offspring
        Update Offspring: Offspring = Best_offspring
    endif
endfor
Replace the vehicle allocation of the worst performing new parent from the set O_1, O_3 with the vehicle
allocation of the Best_offspring
```

The sub-division genetic search continues by randomly selecting other sets of parent couples from the list $O_1$, $O_2$, ..., $O_m$ until a maximum number of allowed iterations are performed. At each iteration, the worst performing parent of the couple is replaced by the $Best_{offspring}$ and while the sub-division crossover ensures that all constraints remain satisfied. The sub-division genetic search allows exploration of different fleet allocation profiles while the penalty function is evaluated at the sub-division level (as opposed to being evaluated at the line level as in the sequential genetic search).

Figure 3:
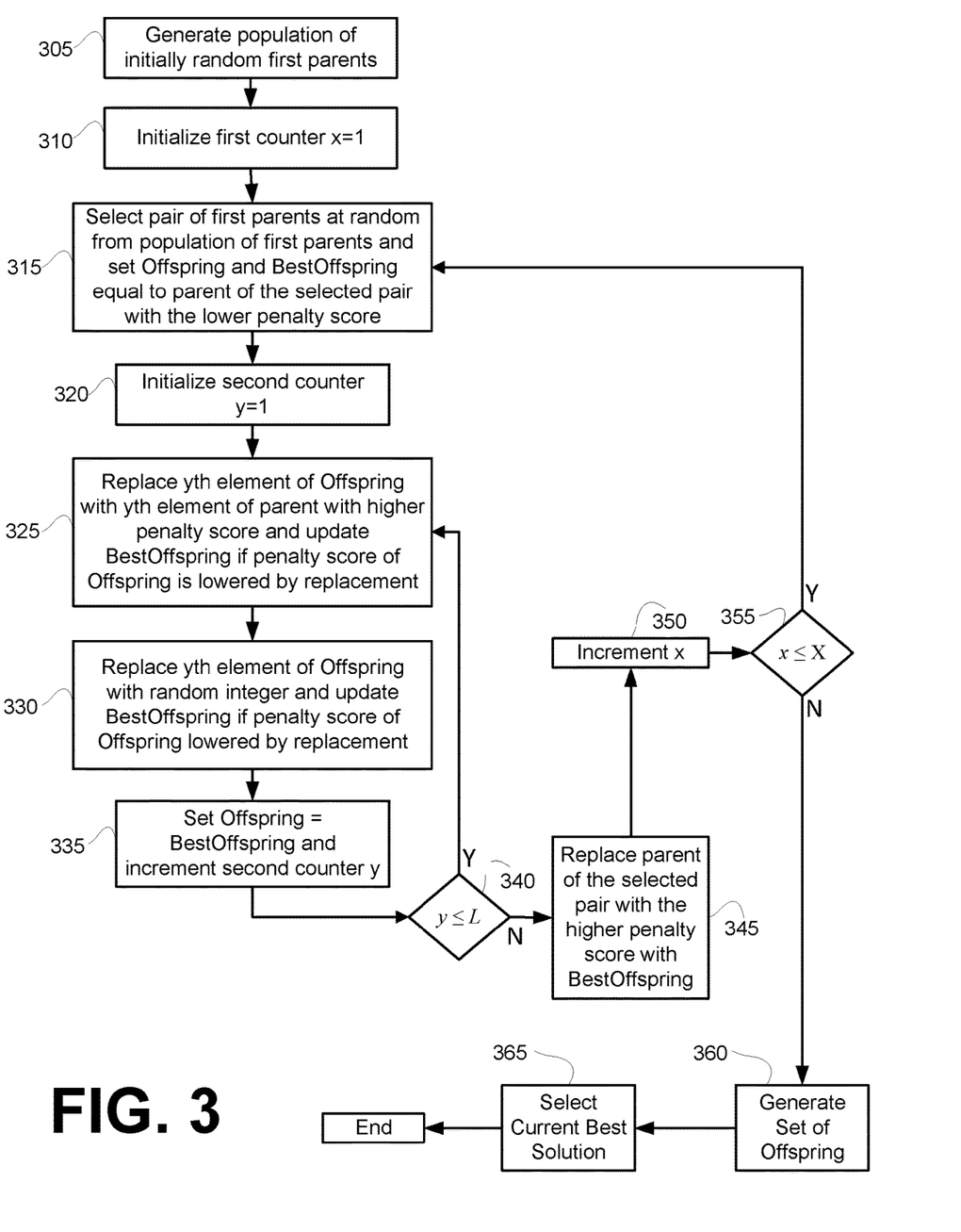
FIG. 3 is a flow diagram of a process by which a sequential genetic search is performed according to an embodiment of the present invention.

FIG. 3 is a flow diagram of a process by which a sequential genetic search is performed according to an embodiment of the invention. At 305, a population of initially random parents $K_1, K_2, \ldots, K_m$ is generated, each parent having a genotype $n^{\{K1\}} = \{n_1^{K1}, \ldots, n_{|L|}^{K1}\}$ where $n_1^{K1}, \ldots, n_{|L|}^{K1}$ are random integer numbers from an admissible set Z. Each of the random integers $n_1^{K1}, \ldots, n_{|L|}^{K1}$ is a number of vehicles allocated to one of an original line or a virtual line. At 310 the process initializes a counter value to one, i.e. x=1.

At 315, two parents $K_i$, $K_j$ are selected at random from the list of initially random parents $K_1, K_2, \ldots, K_m$ and the score of each of the parents $P(n^{\{Ki\}})$ and $P(n^{\{Kj\}})$ is calculated using the penalty function provided by the unconstrained vehicle allocation optimization problem. If $P(n^{\{Ki\}}) \leq P(n^{\{Kj\}})$, then the process sets Offspring=$n^{\{Ki\}}$ and $Best_{Offspring} = n^{\{Ki\}}$. Otherwise, the process sets Offspring=$n^{\{Kj\}}$ and $Best_{Offspring} = n^{\{Kj\}}$.

At 320, the process initializes a second counter value to one, i.e. y=1. At 325, the process replaces, with a 50% probability, $n_y^{Offspring}$ with $n_y^{Kj}$ (where $P(n^{\{Ki\}}) \leq P(n^{\{Kj\}})$) or with $n_y^{Ki}$ otherwise, and if the replacement is performed, calculates the scores $P(n^{\{Offspring\}})$ and $P(n^{\{BestOffspring\}})$. If $P(n^{\{Offspring\}}) < P(n^{\{BestOffspring\}})$ the process then sets $Best_{Offspring}$=Offspring. At 330, the process replaces $n_y^{Offspring}$ with random number from the admissible set Z and again calculates the scores $P(n^{\{Offspring\}})$ and $P(n^{\{BestOffspring\}})$. Once again, if $P(n^{\{Offspring\}}) < P(n^{\{BestOffspring\}})$ the process sets $Best_{Offspring}$=Offspring. At 335 the process sets Offspring=$Best_{Offspring}$ and increments the second counter value y and then, at 340, compares the second counter value y with the total number of values in the genotype, i.e. L. If y≤L, the process returns to 325; otherwise the process proceeds to 345 where the process replaces the parent with the lower score with $Best_{Offspring}$.

Figure 7:
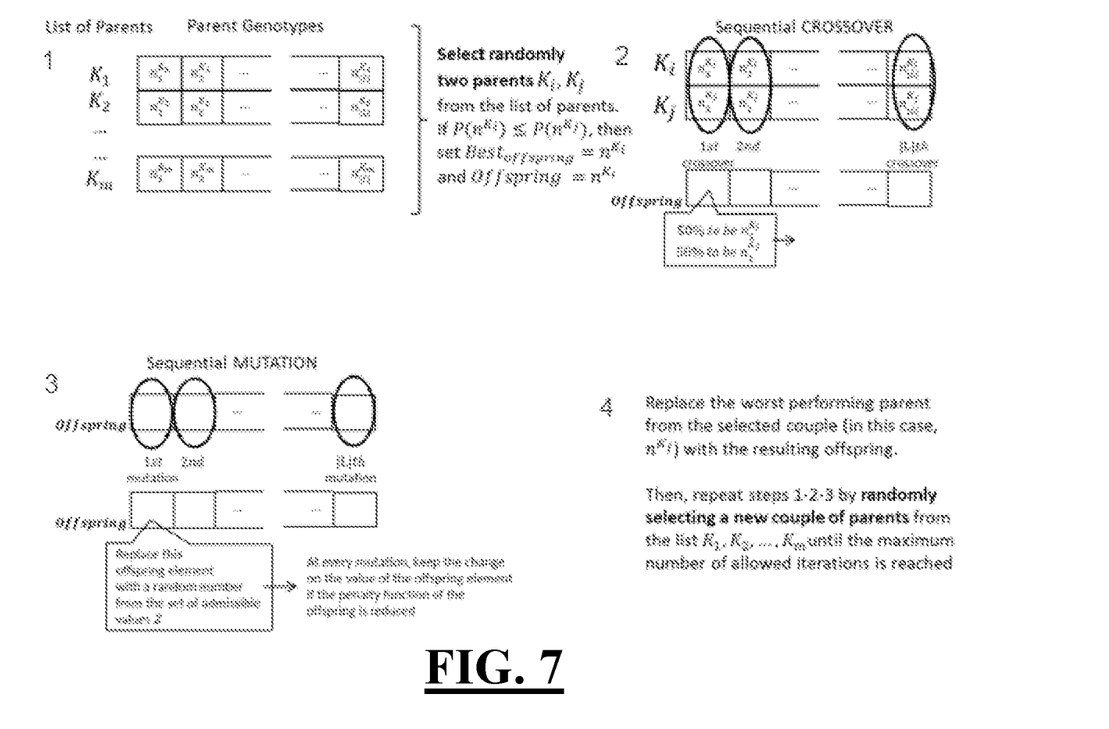
FIG. 7 is a graphic showing random parent selection, sequential crossover, and sequential mutation according to an embodiment of the invention.

FIG. 7 is a graphic showing the random parent selection of 315, the sequential crossover of 325, and the sequential mutation of 330.

At 350, the process increments the counter value x and then, at 355, compares the value of x with a maximum number of allowed iterations, X. If x≤X, the process returns to 315; otherwise the process proceeds to 360 where a set of Offspring $O_1, O_2, \ldots, O_m$ is generated. At 365, the current best solution is selected from the set of all generated Offspring $O_1, O_2, \ldots, O_m$ and provided as output. For example, the process can, at 365, calculate a penalty score for each of the generated Offspring $O_1, O_2, \ldots, O_m$, or alternatively, can utilize a previously calculated penalty score for each of the generated Offspring. For example, such a previously calculated penalty score could be associated with the allocations at 345 and then later be recalled by the process. The solution with the lowest penalty score of all the generated Offspring $O_1, O_2, \ldots, O_m$, which can be referred to as Offspring*, is then designated as the current best solution and provided as output.

By definition of the penalty function, if all constraints are satisfied from the Offspring* solution then the penalty function score $P(n^{\{Offspring^*\}})$ will be equal to the objective function score f(n). Therefore, by reducing further the penalty function score the objective function score f(n) can be reduced exactly the same while assuring that all constraints remain satisfied.

Figure 4:
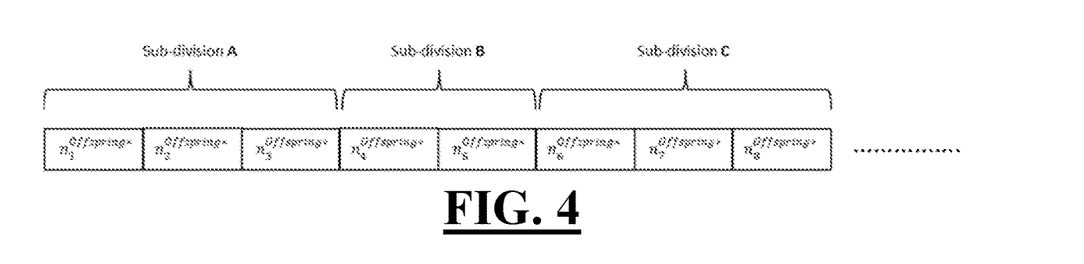
FIG. 4 depicts a subdivision of an allocation of vehicles to lines of a transportation network according to an embodiment of the invention.

FIG. 4 depicts a subdivision of an allocation of vehicles to lines of a transportation network according to an embodiment of the invention. FIG. 4 depicts a random subdivision of an incumbent optimal allocation $n^{\{Offspring^*\}} = \{n_1^{Offspring^*}, \ldots, n_{|L|}^{Offspring^*}\}$. Following the sub-division, a number of vehicles allocated to each sub-division can be calculated. For example, in FIG. 4 the number of vehicles allocated to sub-division A is $N_A = n_1^{Offspring^*} + n_2^{Offspring^*} + n_3^{Offspring^*}$.

Figure 5:
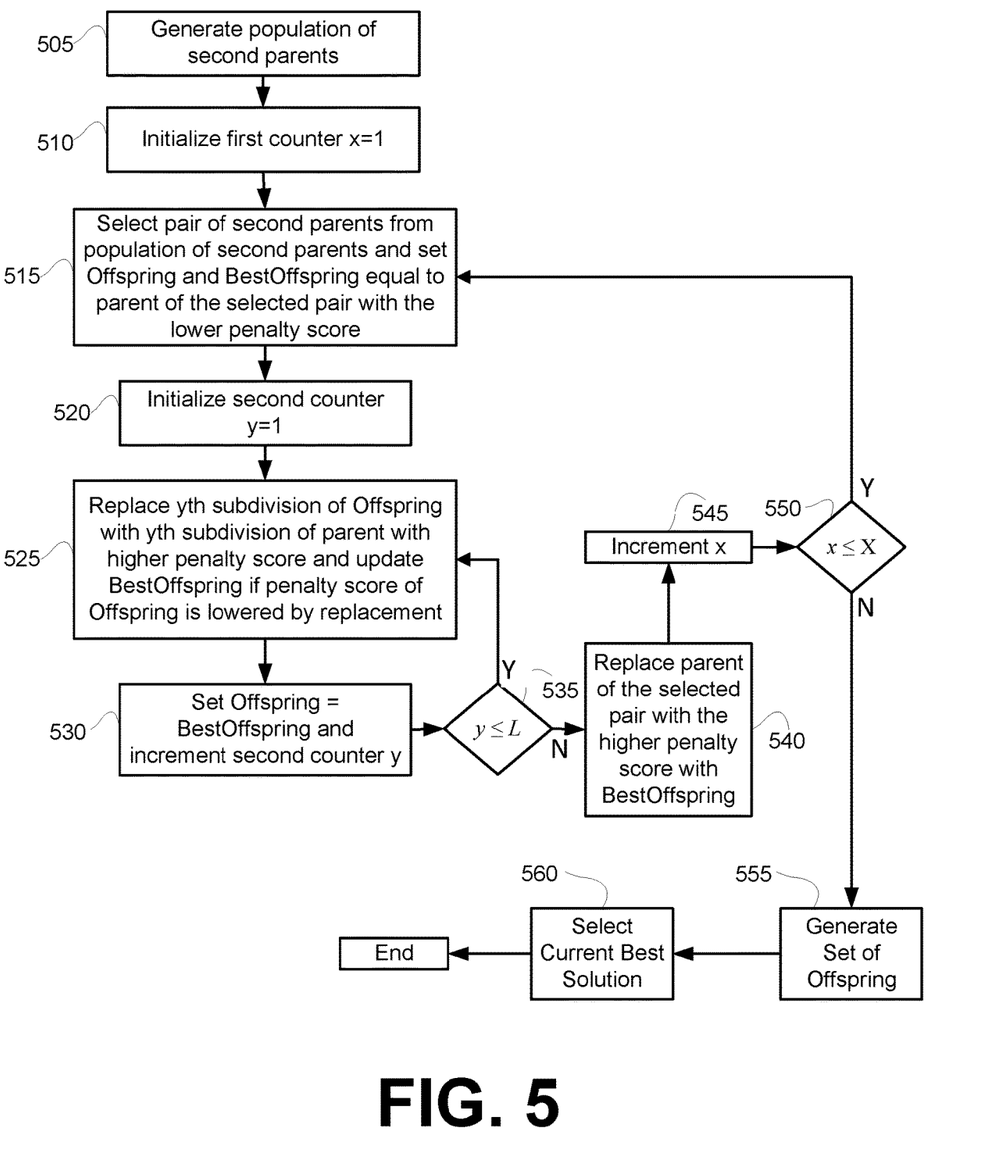
FIG. 5 is a flow diagram of a process by which a second genetic search is performed according to an embodiment of the present invention.

FIG. 5 is a flow diagram of a process by which a second genetic search is performed according to an embodiment of the present invention. At 505, a population of new parents, or second parents, $O_1, O_2, \ldots, O_m$ is generated. Those parents are generated in such a manner that all constraints remain satisfied. For example, parent $O_1$ has a total number of vehicles allocated to sub-division A equal to $N_A$, at sub-division B equal to $N_B$, and so on such that the number of vehicles allocated by parent $O_1$ to each sub-division is equal to the number of vehicles allocated to the same sub-division by the incumbent optimal solution Offspring*. In this way, each element of the parents $O_1, O_2, \ldots, O_m$ is randomly selected, but selected in such way that the sum of vehicles of each parent at each subdivision is equal to the sum of vehicles of the Offspring* solution that satisfy all constraints.

At 510, the process initializes a counter value to one, i.e. $x=1$. At 515, two parents $O_i$, $O_j$ are selected at random from the list of initially random parents $O_1, O_2, \ldots, O_m$ and the score of each of the parents $P(n^{\{O_i\}})$ and $P(n^{\{O_j\}})$ is calculated using the penalty function provided by the unconstrained vehicle allocation optimization problem. If $P(n^{\{O_i\}}) \leq P(n^{\{O_j\}})$, then the process sets Offspring=$n^{\{O_i\}}$ and Best$_{Offspring}$=$n^{\{O_i\}}$. Otherwise, the process sets Offspring=$n^{\{O_j\}}$ and Best$_{Offspring}$=$n^{\{O_j\}}$.

At 520, the process initializes a second counter value to one, i.e. $y=1$. At 525, the process replaces, with a 50% probability, the yth subdivision of the Offspring with the yth sub-division of $O_j$ (where $P(n^{\{O_i\}}) \leq P(n^{\{O_j\}})$) or with the yth sub-division of $O_i$ otherwise, and if the replacement is performed, calculates the scores $P(n^{\{Offspring\}})$ and $P(n^{\{BestOffspring\}})$. If $P(n^{\{Offspring\}}) < P(n^{\{BestOffspring\}})$ the process then sets Best$_{Offspring}$=Offspring. At 530 the process sets Offspring=Best$_{Offspring}$ and increments the second counter value y and then, at 535, compares the second counter value y with the total number of sub-divisions, i.e. S. If $y \leq S$, the process returns to 525; otherwise the process proceeds to 540 where the process replaces the parent with the lower score with Best$_{Offspring}$.

At 545, the process increments the counter value x and then, at 550, compares the value of x with a maximum number of allowed iterations, X. If $x \leq X$, the process returns to 515; otherwise the process proceeds to 555 where a set of new Offspring $O_1, O_2, \ldots, O_m$ is generated. At 560, the best solution is selected from the set of all generated new Offspring $O_1, O_2, \ldots, O_m$ and provided as output.

Prior to performing demand-responsive fleet dispatching using any of the processes described in FIGS. 2, 3, and 5 (or portions or combinations thereof), it is necessary to identify all original lines and potential lines of the transportation service. Typically, in public transport services, the original lines serve a number of sequential, pre-defined points and can be two-directional or circular. Virtual lines on the other hand can, for example, serve smaller sub-sections of the original lines or perform interlining. Virtual lines can, for example, be generated by applying short-turn and interlining operations on the original lines.

Starting from the original lines, a set of virtual lines can be generated for short-turn scenarios and interlining scenarios. Not all generated virtual lines need be operational (some of them might not be operated by vehicles if they do not match the demand properly and/or have high operational costs). Therefore, there is no initial guarantee that virtual lines will be operational (this is decided during the demand-responsive fleet dispatching processes).

One process can be used to generate short-turn virtual lines while a different process can be used to generate interline virtual lines. For generating short-turn virtual lines, all points of an original line or a smaller set of significant control points of that original line can be considered as potential short-turn points. In generating short turn lines, a process can select one original service line l on which to generate short-turn related lines for tackling a demand imbalance present between different parts of that original service line. Thereafter, the process can iteratively select each of the other original service lines and generate short-turn related lines for tackling demand imbalances present between different parts of those original service lines. The short-turn related lines will be sub-lines of the original service line and will cover a fraction of the points covered by the original line in exactly the same sequence as those points are covered on the original line. In addition, the short-turn related lines can be required to visit either the origin point of the original line or the destination point of the original line (as those points are used as terminals where the vehicle driver can rest after the completion of each virtual line trip).

In generating short turn lines for a selected service line l, a process can select one service start point and generate a set of possible short-turn virtual lines that begin at the selected service start point and then iteratively select every other potential service start point on the selected service line l and generate sets of possible short-turn lines for each of those potential service start points. For each selected service start point, the process can select all potential break points at which the virtual line could end. The potential break points can be any other point on the original service line or some subset thereof. When generating virtual lines for a selected start point and break point of a selected original line, the process can determine whether a rest point is required for the virtual line, and if so, select a rest point from amongst possible rest points. The process can also determine whether deadhead time, i.e. time for a trip from the break point to return to the starting point with no passengers, is required for the virtual line.

In generating interline virtual lines interlining between control points of different original lines can be enabled. Although bi-directional short turn virtual lines can serve parts of original lines with excessive demand, such virtual lines do not provide a mechanism for addressing directional demand imbalances. However, circular interlining services can address directional demand imbalances by serving one-directional demand. Therefore, circular interlining services can avoid the inefficiency that would otherwise result when additional bi-directional short turn service lines are introduced to satisfy high but directionally imbalanced demand.

In generating interline virtual lines, a process can select one original service line l on which to an interline virtual lines can originate and then iteratively select each of the other original service lines and generate interline virtual lines that originate from those original service lines. In generating interline virtual lines for a selected service line l on which the virtual lines originate, a process can select one service start point and generate a set of possible interline virtual lines that begin at the selected service start point and then iteratively select every other potential service start point on the selected service line l and generate sets of possible interline virtual lines for each of those potential service start points. For each selected service start point, the process can select all potential outgoing points at which the interline virtual line departs the selective service line l on which the virtual line originates. For each selected outgoing point, the process can consider all potential transfer points on other original service lines at which the interline virtual line could continue.

Figure 6:
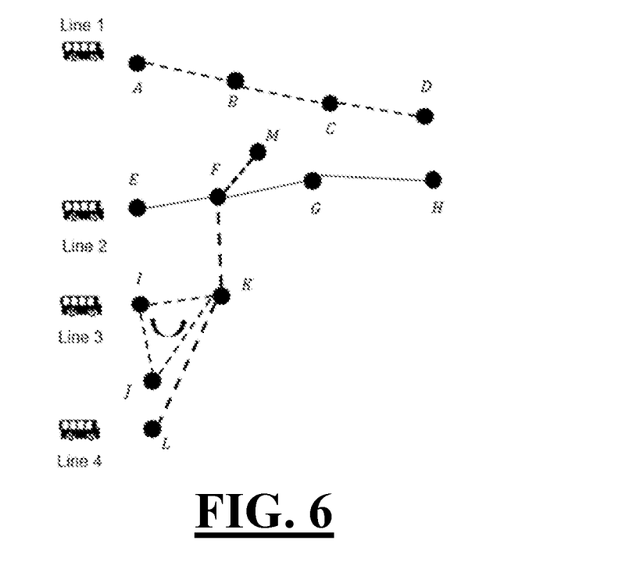
FIG. 6 depicts a set of original lines of an autonomous transport service according to an embodiment of the invention.

FIG. 6 depicts a set of original lines of an autonomous transport service according to an embodiment of the invention. Applying a method according to an embodiment of the invention to allocate vehicles to the set of four autonomous vehicle lines of FIG. 6 generated a range of 26 feasible virtual lines (short-turn and interlining lines) leading to |L|=30 lines. Then, a number of heuristic and exact optimization methods were tested against the method according to the embodiment of the invention yielding the results of Table 1.

TABLE 1

| | |
|---|---|
| Initial Score of the Penalty Function | 273,907,112.884 (the valuei s so high because most of the constraints are violated when starting from a random initial stage) |
| Optimal Score of the Penalty Function when allocating vehicles only at the four (4) original lines | 0.0935155799087 |
| Optimal Score of the Penalty Function after optimization with Sequential Quadratic Programming | N/A because of the non-convexity of the objective function and the presence $K_{lo, i, j}$ function in the objective function |
| Optimal Score of the Penalty Function after optimization with Differential Evolution | 223,907,112.884 |
| Optimal Score of the Penalty Function after optimization with Simulated Annealing | 121,907,112.884 |
| Optimal Score of the Penalty Function after optimization with the sequential genetic search with sub-division crossover | 0.0656239 |

From table 1, an improvement of 25.8% was realized by allocating vehicles to virtual lines and not only at the original lines with the use of the sequential genetic search with sub-division crossover according to them embodiment of the invention. Exact optimization methods could not converge to an optimal while other SoA heuristics for discrete optimization such as Simulated Annealing could not converge due to local optimum traps which did not allow the algorithm to explore other parts of the solution space.

The sequential genetic search with sub-division crossover according to the embodiment of the invention is a heuristic approach that can return a different approximate global optimum every time it is executed. Therefore, the transport operator can get different allocations of vehicles to original and virtual lines that have almost the same effect on reducing the penalty score and select the one which is easier to implement in practice (select "the more practical allocation"). For improving the practical implementation, transport operators can set tighter constraints on the characteristics of virtual lines that can be served from their vehicles and the sequential genetic search with sub-division crossover will return solutions that satisfy those requirements due to the treatment of those constraints as penalties.

Different transport services might have a set of predetermined tactical and operational requirements that do not allow the optimal allocation of vehicles to the original and virtual lines. For instance, one transport operator that operates a number of services might have a number of additional constraints apart from the total number of available vehicles. Typical examples of those constraints can be: (1) each service line should have at most an X minute headway between consecutive vehicles for ensuring that passengers/goods do not wait more than that time; (2) vehicle drivers might prefer to operate more at the original lines because they are more experienced on those routes and at least X % of the number of available vehicles should be assigned to those lines; (3) operators might prefer to achieve a certain balance between the generated short-turn and interlining lines by setting a percentage of X % for short-turn lines and 100-X % for interlinings.

Those constraints can be treated exactly like the total number of available vehicles that is presented in equation 1. For the implementation of those constraints during the optimization process where the total number of available vehicles are allocated to different original and virtual lines those constraints are introduced to the objective function with the use of penalty terms. Those penalty terms are greater than zero when the problem constraints are violated (thus, adding more cost to the original objective function of eq. 1) and equal to zero when all constraints are satisfied (thus, not affecting negatively the objective function score). The weights of the penalty terms have high values to ensure that priority is given to the satisfaction of constraints over the objective function minimization. Therefore, the constrained optimization problem of equation 1 is transformed to an approximate unconstrained one where all the constraints imposed by the transport operator are modeled as penalty terms. Therefore, by satisfying those constraints the potential of improving the demand matching and operational costs by allocating vehicles to original and virtual lines is reduced since the constraints might not permit the selection of the best option. To give a practical example, from table 1 an improvement of 25.8% was realized by allocating vehicles to virtual lines and original lines with the use of the sequential genetic search with sub-division crossover. If the transport operator though dictates that at least 80% of the vehicles should be allocated to original lines to improve the service practicability, then this improvement falls to 11.6% at this particular scenario.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for automatically allocating a plurality of available vehicles to a plurality of original service lines and virtual service lines of a transportation network, the method comprising:
   receiving the virtual lines from a virtual line generator;
   approximating a constrained fleet allocation problem with an unconstrained fleet allocation problem that utilizes penalty terms to penalize violation of constraints;
   performing a multi-start sequential genetic search using a first population to identify a first solution;
   generating, using the first solution, a second population;
   performing a second multi-start genetic search using the second population to identify a second solution; and
   dispatching vehicles to different routes and lines according to the second solution.

2. The method according to claim 1, further comprising generating the first population.

3. The method according to claim 2, wherein generating the first population comprises:
   providing a set of first parents, each first parent having a number of elements equal to a combined number of the original service lines and the virtual service lines of the transportation network; and
   randomly assigning, to each element of each first parent, a number of vehicles,
   wherein the number of vehicles is selected from an admissible set of integers.

4. The method according to claim 3, wherein performing the multi-start sequential genetic search includes selecting a pair of first parents and performing, on an element-by-element basis, crossovers from one of the pair of first parent to a second of the pair of first parents.

5. The method according to claim 3, wherein performing the multi-start sequential genetic search includes selecting a pair of first parents, comparing penalty scores of the pair of first parents so as to determine a worst performing parent, and randomly replacing one or more numbers of vehicles assigned to one or more elements of the worst performing parent with one or more numbers of vehicles selected from the admissible set of integers.

6. The method according to claim 1, wherein the first solution includes a number of elements equal to a combined number of the original service lines and the virtual service lines of the transportation network.

7. The method according to claim 6, wherein each respective element of the first solution specifies a number of vehicles to assign to an original service line or a virtual service line that corresponds to the respective element.

8. The method according to claim 6, wherein generating, using the first solution, the second population comprises:
   dividing the elements of the first solution into a number of subdivisions;
   determining, for each respective subdivision, a number of allocated vehicles a sum of values of respective elements of the respective subdivision;
   providing a set of second parents, each second parent having the number of elements equal to the combined number of the original service lines and the virtual service lines of the transportation network and the number of subdivisions;
   randomly assigning, to each element of each second parent, a number of vehicles such that the number of vehicles assigned to each subdivision of each second parent is equal to the number of vehicles allocated to a corresponding subdivision of the first solution.

9. The method according to claim 8, wherein performing the second multi-start genetic search comprises selecting a pair of second parents and performing, on a subdivision-by-subdivision basis, crossovers from one of the pair of second parents to a second of the pair of second parents to form, after each replacement, an offspring.

10. The method according to claim 9, wherein after each replacement, a penalty score of the offspring is calculated.

11. The method according to claim 10, wherein an offspring with the lowest calculated penalty score is used to replace one of the pair of second parents that has a higher penalty score.

12. The method according to claim 1, wherein the second solution includes a number of elements equal to a combined number of the original service lines and the virtual service lines of the transportation network.

13. The method according to claim 12, wherein each respective element of the second solution specifies a number of vehicles to allocate to an original line or a virtual line that corresponds to the respective element.

14. The method according to claim 13, wherein dispatching vehicles to different routes and lines according to the second solution comprises allocating, to each original line and to each virtual line, the number of vehicles specified by the second solution.

15. A fleet dispatcher for automatically allocating a plurality of available vehicles to a plurality of original service lines and virtual service lines of a transportation network, the system comprising:
   a processor configured to execute processor-executable instructions stored at a processor-readable memory for:
      receiving the virtual service lines;
      approximating a constrained fleet allocation problem with an unconstrained fleet allocation problem that utilizes penalty terms to penalize violation of constraints;
      performing a multi-start sequential genetic search using a first population to identify a first solution;
      generating, using the first solution, a second population;
      performing a second multi-start genetic search using the second population to identify a second solution; and
      dispatching vehicles to different routes and lines according to the second solution.

* * * * *